2,435,644

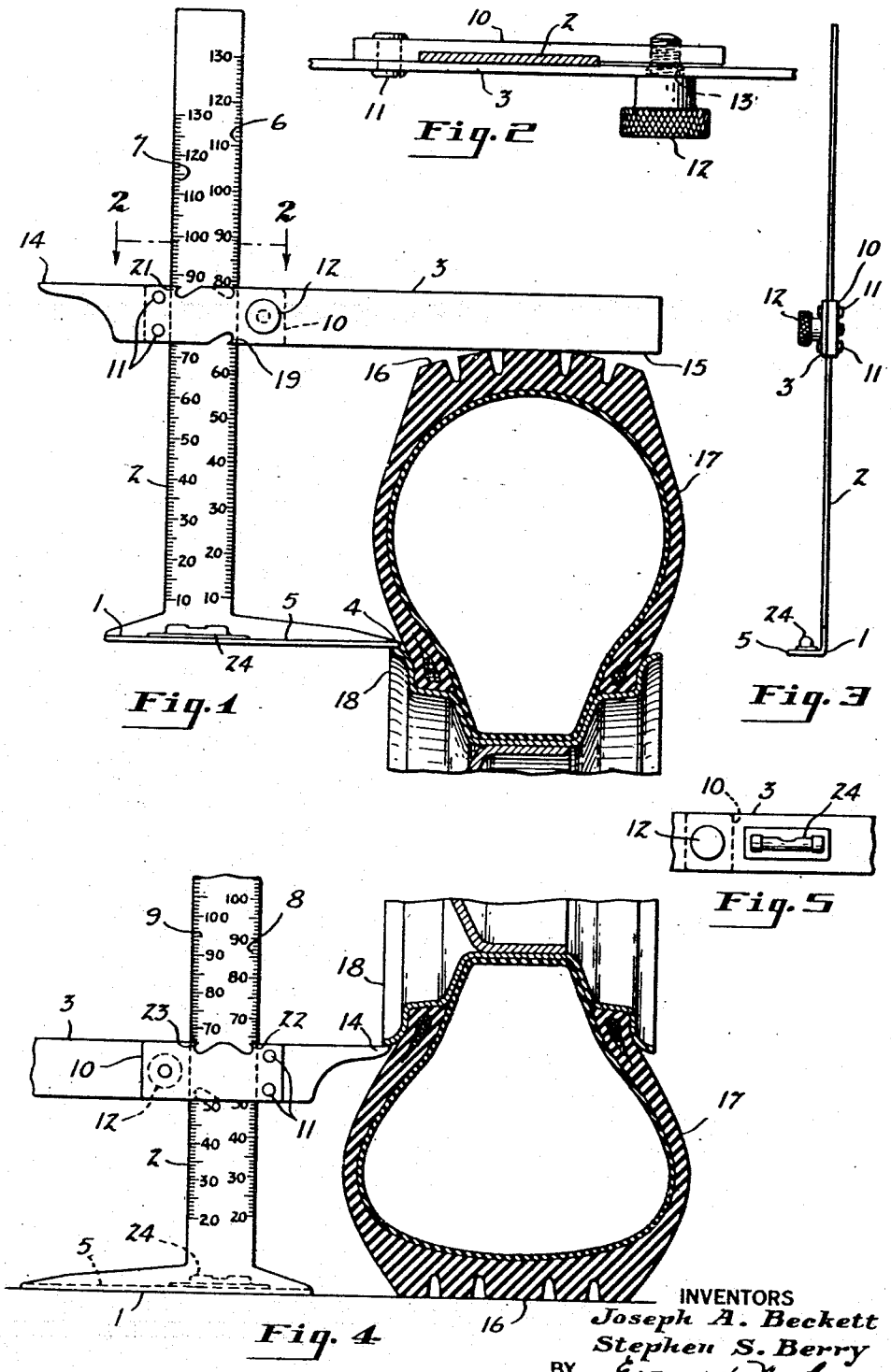
Feb. 10, 1948.    J. A. BECKETT ET AL    2,435,644
GEOMETRICAL MEASURING MEANS FOR DETERMINING INFLATION
PRESSURE OF LOADED PNEUMATIC TIRES
Filed May 14, 1943
INVENTORS
Joseph A. Beckett
Stephen S. Berry
BY Evans + McCoy
ATTORNEYS Patented Feb. 10, 1948

UNITED STATES PATENT OFFICE 2,435,644

GEOMETRICAL MEASURING MEANS FOR DETERMINING INFLATION PRESSURE OF LOADED PNEUMATIC TIRES

Joseph A. Beckett and Stephen S. Berry, Akron, Ohio, assignors to The General Tire & Rubber Company, Akron, Ohio, a corporation of Ohio Application May 14, 1943, Serial No. 486,988

7 Claims. (Cl. 33—169)

This invention relates to a method of and a means for determining the proper inflation pressure for pneumatic tires in service on motor vehicles and, more particularly, to an instrument for measuring the radial depth of an undeflected portion of a pneumatic tire and for indicating the correct amount of deflection for the portion of the tire which is deflected by the load, so that the proper inflation pressure to be used for the tire may be determined.

A pneumatic tire may be considered to be a high speed, shock-absorbing machine with a substantially fixed range of vertical motion that is comparable to the stroke of a piston in an engine. Air under compression is the material used to hold the tire up to its operating height and each size of tire is designed to carry a certain rated load, the air pressure of the tire being fixed at an exact level in relation to that load. When the tire is carrying its rated load with the proper air pressure, it will operate within its true mechanical stroke or limit of deflection, it will cushion the vehicle effectively and will have a maximum mileage life. On the other hand, if the tire is badly overloaded or under-inflated, or both, it will be deflected or flattened far beyond its true mechanical stroke; it will be sluggish in action and will quickly break down or wear out. If a tire be operated with too great a pressure for the load imposed thereon, its cushioning action will be reduced and the rate of tread wear will be increased.

The present invention has for its object to prolong the life of tire treads and tire carcasses by enabling the operators of motor vehicles to quickly and easily determine the inflation pressure which a tire in service on a motor vehicle requires to enable it to operate with maximum efficiency.

A further object of the invention is to enable the operators of motor vehicles to readily determine whether a tire in service on a vehicle is of the proper capacity for the load which it supports.

It is also an object of the invention to provide an instrument by which the radial depth of the portion of the tire deflected under load and also the radial depth of an undeflected portion of a tire may be measured, and which also serves to indicate the proper ratio between the radial depths of the deflected and undeflected portions of a tire.

The invention has for an additional object to provide a deflection-measuring instrument which has a plurality of proportionally graduated scales by means of which the proper deflection for any one of a number of types of tires may be indicated.

Reference should be had to the accompanying drawings forming a part of this specification, in which a suitable embodiment of the invention is illustrated and in which:

Figure 1 is a view showing the instrument of the present invention being used to take the measurement of an undeflected portion of an inflated pneumatic tire, the tire being shown in section and the instrument in side elevation;

Fig. 2 is an enlarged, fragmentary, sectional view of a portion of the instrument taken as indicated by the line 2—2 in Fig. 1;

Fig. 3 is an edge elevation of the instrument shown in Fig. 1;

Fig. 4 is a view similar to that shown in Fig. 1 showing the instrument being used to indicate the correct deflection of a tire under load; and Fig. 5 shows a modified form of the device in which the leveling indicator is carried by the movable measuring beam.

Motor vehicle tires are designed to operate under predetermined loads and each tire is designed to have a predetermined amount of deflection in the road-engaging portion thereof when subjected to that load. The construction of tire casings has become so standardized that all tires of a given class have substantially the same deflection characteristics, the amount of deflection under a given load being substantially the same for new tires of each size in each class. This uniformity has made possible recommendations for definite inflation pressures for automobile tires and also for the heavier tires used on trucks and buses. The practice of maintaining the recommended pressures results in a substantial increase in the average life of tires, but, in view of the fact that the load to which the tires are actually subjected may be much more or much less than the load for which the pressure recommendations are correct, unsatisfactory tire mileage may be obtained due to excessive or insufficient deflection under load, even though the recommended pressures are maintained.

The present invention makes it possible to further increase the life of pneumatic tires by providing a simple and convenient method of determining the proper inflation pressure for each tire while it is in service on a vehicle, and this method consists in measuring the radial depth of an undeflected portion of a tire in service on a vehicle and then adjusting the inflation pressure of the tire until the radial depth of the deflected portion of the tire is in the proper ratio to the radial depth of the undeflected portion of the tire.

To facilitate measurements of the depths of the undeflected and deflected portions of a tire in service on a vehicle, an implement has been devised which is adapted to measure the radial depth of the undeflected portion of the tire and which is adapted to be set to indicate the proper radial depth of the portion of the tire deflected under load so that the correct inflation pressure for the tire may be provided.

In the accompanying drawings, a tire measuring and deflection-indicating instrument is shown which is in the form of a slide caliper that is adapted to measure the radial depth of an undeflected portion of an inflated tire from the edge of a rim flange to the center of the tread periphery, and which has means for utilizing this measurement to obtain an indication of the proper amount of deflection of the portion of the tire engaging the ground.

The instrument shown in the drawings comprises a foot-piece 1 to which is attached a graduated standard 2 and a crossbar 3 which is perpendicular to the standard and slidable thereon. The foot-piece 1 has one end projecting laterally from the standard 2 and terminating in a tapered end portion 4 which is adapted to engage with the flange of the rim upon which the tire is mounted. The foot-piece 1 has a flange 5, extending the full length thereof, which has a flat bottom disposed perpendicularly to the standard 2.

The standard 2 has a tire-measuring scale 6 along one edge thereof which is graduated in units of linear measurements which are numbered from a datum point in the flat base of the foot-piece. Additional scales 7, 8 and 9 are provided along the opposite edge of the same face of the standard as that upon which the scale 6 is formed and upon the two edges of the opposite face. All of the scales are uniformly graduated and each, like the scale 6, is numbered from a datum point in the plane of the base. However, the lengths of the spaces between the graduations of the scales 7, 8 and 9 are predetermined fractions of the length of the spaces between the successive graduations of the scale 6. The linear units of the scales 7, 8 and 9 are each less than the linear units of the scale 6 and each of the scales 7, 8 and 9 is adapted to indicate the proper radial depth to which the portion of the tire directly beneath the axle should be deflected under its load. For example, the length of the linear units of the scale 7 may be 90% of the length of the linear units of the scale 6 so as to indicate the proper deflection for a special type of truck tire which has the proper inflation pressure when the radial depth of the portion of the tire deflected under load is 90% of the radial depth of undeflected portions of the tire. Scale 8 may indicate 88% of the measurement indicated on the scale 6 and show the proper deflection for ordinary truck tires. Scale 9 may indicate 84% of the measurement on the scale 6 to show the proper deflection for automobile tires. The percentages of the scales 7, 8 and 9 may be altered for different makes and types of tires or in view of changes in methods of tire making. It will be apparent that additional deflection-indicating scales may be provided upon the standard, if so desired.

The crossbar 3 may be mounted on the standard 2 by means of a guiding and clamping strip 10, which is of the same width as the bar 3 and grooved to receive the standard 2 and which is rigidly attached to the crossbar 3 at one end by suitable means, such as rivets 11. The opposite end of the strip 10 is secured to the bar 3 by means of an adjusting screw 12 which has a reduced end 13 extending through an aperture in the bar 3 and in threaded engagement with the end of the strip 10. By turning the screw 12 the end of the strip 10 engaged by the screw may be loosened to permit the bar to slide vertically of the standard or may be drawn toward the face of the bar 3 to clamp the standard 2 and hold the bar 3 in adjusted position.

The crossbar 3 has a finger 14 at one end thereof which projects laterally from the standard 2 for engagement with a rim flange. The opposite end of the bar 3, which projects from the opposite side of the standard 2 and which overlies the rim-engaging portion 4 of the foot-piece and projects beyond the same, is provided with a straight edge 15 on its underside which is adapted to engage with the periphery of a tread 16 of a tire 17, as shown in Fig. 1. In measuring the radial depth of an undeflected portion of a tire, the end portion 4 of the foot-piece 1 is placed upon the edge of a flange 18 of the rim upon which the tire 17 is mounted, with the base of the foot-piece perpendicular to the center plane of the tire, after which the crossbar 3 is moved into engagement with the tire tread.

The crossbar 3 has a pointer 19 aligned with the edge 15 formed by a notch 20 in its lower edge 15 which registers with the scale 6 to indicate the radial depth of the tire. Pointers 21, 22 and 23, similar to the pointer 19, are provided on the top edges of the bar 3 and strip 10 in alignment with the top edge of the finger 14, and these pointers register with the scales 7, 8 and 9, respectively.

After the reading on the scale 6 indicating the radial depth of the tire has been taken, the crossbar 3 is adjusted to bring its top edge into registry with the corresponding graduation on one of the scales 7, 8 or 9, after which the foot-piece 1 is placed upon the floor or ground surface alongside the deflected portion of the tire, as shown in Fig. 4. If the tire has the proper inflation pressure, the flange 18 will be at the height to engage with the top edge of the finger 14. If the inflation pressure is too high, the rim flange will be spaced above the finger 14 and air may be let out of the tire until the flange is lowered to the proper position. If the inflation pressure is insufficient, the edge of the rim flange will be below the top edge of the finger 14 and the proper inflation pressure may be provided by introducing air into the tire until the edge of the rim flange is raised to the level of the top of the finger 14.

It is desirable that the base of the foot-piece 1 and the crossbar 3 be in horizontal position when the measurements are taken and a suitable level 24 may be mounted on the foot-piece 1, as shown in Fig. 1, or on the crossbar as shown in Fig. 5, to indicate the horizontal position of the members.

The device of the present invention also serves to indicate when tires are of a capacity inadequate for the load which they are required to carry. The inadequate capacity of a tire is indicated when it is found that the pressure necessary to maintain proper deflection is considerably greater than the recommended pressure for the particular tire. If a pressure as much as 20% greater than the recommended pressure is required to obtain the proper deflection, the tire is seriously overloaded and a tire of larger size should be substituted.

The device of the present invention can be advantageously used for determining the correct pressure for operation under different loads and for different periods during the life of a tire. A substantial change in load, such as occasioned by shifting a tire from a front to a rear wheel, or vice versa, should be accompanied by a corresponding change in inflation pressure. The present invention provides a means for accurately determining the proper pressure for each tire.

The instrument of the present invention indicates the proper inflation pressure for any tire regardless of whether the tire is new or is partly worn or whether the tire has stretched while in service or has been retreaded. Since the proper ratio of the deflected depth to the undeflected depth of the tire is substantially constant throughout the life of a tire the instrument of the present invention enables the proper inflation pressure to be provided even though the size of the tire has changed from the original manufacturing specification, due to wear, stretch or retreading.

The instrument of the present invention is also useful in obtaining greater wear of dual tires. Unless dual tires are properly matched as to size they will be unevenly loaded and one tire or the other of the pair is likely to be subjected to excessive wear. Only a slight difference in the sizes of dual tires is permissible and where there is a slight difference the larger tire should be upon the outside. The tires, at equal inflation pressures, may be accurately measured by the device of the present invention to determine the proper arrangement of the tires on the dual rims. After making sure that the tires are properly matched, the proper inflation pressure for both tires of each pair may be determined by checking the outside tire only. After the inflation pressure of the two tires has been adjusted to the amount indicated by the instrument of the present invention, approximately five pounds additional pressure should be supplied to the outside tire to compensate for the average road crown.

It is to be understood that the particular means for determining the proper inflation pressure for tires in service, shown and described herein, serves for illustration and explanation of the invention and that various modifications therein may be made without departing from the invention, as defined by the appended claims.

What we claim is:

1. An instrument for use in determining the proper inflation pressure for pneumatic tires in service on motor vehicles provided with a measuring means comprising relatively movable tread and rim-engaging elements having a graduated scale associated therewith by which the radial depth of an undeflected portion of a tire may be ascertained, and an indicating means comprising relatively adjustable rim and ground-engaging elements adapted to indicate the radial depth of the deflected portion of the tire upon which the load is imposed, the latter elements having a graduated scale associated therewith for indicating adjustments thereof to spacings which are in a predetermined ratio to the measured radial depth of an undeflected portion of the tire.

2. An instrument for use in determining the proper inflation pressure for pneumatic tires in service on motor vehicles comprising two relatively movable members, one having tread and rim-engaging portions and the other having rim and ground-engaging portions, means for connecting said members and for securing the same in adjusted positions, a graduated scale associated with the tread-engaging portion of one member and the rim-engaging portion of the other for indicating the radial depth of an undeflected portion of a tire, a second scale for indicating a proportional adjustment of said members to space the ground-engaging portion of one member and the rim-engaging portion of the other to the proper radial depth for the portion of the tire deflected under load.

3. An instrument for use in determining the proper inflation pressure for pneumatic tires in service on motor vehicles comprising an elongated foot-piece having a flat base and a rim-engaging end portion, a standard fixed to the foot-piece, perpendicular to said base and spaced from said rim-engaging end, a crossbar parallel to said base and slidable on said standard, said bar having a tread-engaging portion projecting past said rim-engaging end of the foot-piece and adapted to coact with said rim-engaging end to measure the height of an undeflected portion of a tire, the opposite end of said bar having a rim-engaging portion adapted to coact with the flat base to indicate the height of the deflected portion of the tire.

4. An instrument for use in determining the proper inflation pressure for pneumatic tires in service on motor vehicles comprising an elongated foot-piece having a flat base and a rim-engaging end portion, a standard fixed to the foot-piece, perpendicular to said base and spaced from said rim-engaging end, said standard having a uniformly graduated measuring scale thereon numbered from a datum point at said base, said standard having a second uniformly graduated indicating scale numbered from the same datum point but having its graduations more closely spaced than the first scale, a crossbar parallel to the base and slidable upon said standard, said bar having tread and rim-engaging portions and indicating portions in alignment with said portions adapted to register with the graduations of said scales, and means for securing said bar in adjusted positions.

5. An instrument for use in determining the proper inflation pressure for pneumatic tires in service on motor vehicles comprising in combination a graduated standard, a foot-piece having a flat base perpendicular to the standard rigidly carried by one end of said standard and having a rim-engaging end portion spaced laterally at the standard, a movable crossbar parallel to the base and movable along said standard and having a rim-engaging portion on one end projecting laterally from the standard and an elongated, oppositely projecting, tread-engaging straight edge on the other end overlying and projecting past the rim-engaging portion of the foot-piece, and a level carried by the device for indicating the horizontal position of said base and crossbar.

6. A tire-measuring caliper comprising in combination a standard having a foot-piece at one end thereof and bearing a scale composed of uniformly spaced graduation marks along an edge thereof, said foot-piece having a flat base serving as the datum point from which said graduation marks are numbered and having an end portion spaced from the standard and engageable with a wheel rim, a movable crossbar arranged normal to said standard and adjustably mounted on said standard, said crossbar having a tread-engaging bottom edge overlying and projecting past the rim-engaging end of said foot-piece and having a pointer aligned with said bottom edge indicating a reading on said scale, and a level carried by said caliper for indicating the horizontal position of said base and crossbar.

7. An instrument for use in determining the proper inflation pressure for tires in service on motor vehicles comprising in combination a standard having a scale graduated in units of linear measure and disposed along one edge thereof and a second scale along another edge of the standard and graduated in units that are a fractional part of the length of said first-mentioned units, the units of said scales being numbered from the same datum point, said standard terminating at one end in a foot-piece having a flat base perpendicular to said standard at said datum point and having a laterally projecting rim-engaging end portion, and a crossbar slidably mounted on said standard and having a tread-engaging straight edge projecting from one side of the standard parallel to the base and projecting past the rim-engaging portion of the foot-piece, and an indicating portion in alignment with the straight edge and contiguous to said first-mentioned scale, said crossbar having a rim-engaging portion projecting from the opposite side of the standard and an indicating portion aligned with the rim-engaging portion and contiguous to said second scale.

JOSEPH A. BECKETT.
STEPHEN S. BERRY.

REFERENCES CITED

The following references are of record in the file of this patent:

UNITED STATES PATENTS

| Number | Name | Date |
| --- | --- | --- |
| 1,263,229 | Gordon | Apr. 16, 1918 |
| 1,404,425 | Bartholdy | Jan. 24, 1922 |
| 1,808,421 | Klopsteg | May 12, 1931 |
| 1,245,213 | Gammeter | Nov. 6, 1914 |